United States Patent [19]

Aritsuka et al.

[11] Patent Number: 5,715,412
[45] Date of Patent: Feb. 3, 1998

[54] METHOD OF ACOUSTICALLY EXPRESSING IMAGE INFORMATION

[75] Inventors: Toshiyuki Aritsuka, Higashi-Murayama; Nobuo Hataoka, Shiroyama, both of Japan; Yoshito Nejime, Cambridge, United Kingdom; Toshikazu Takahashi, Hachioji, Japan

[73] Assignee: Hitachi, Ltd., Tokyo, Japan

[21] Appl. No.: 572,892

[22] Filed: Dec. 18, 1995

[30] Foreign Application Priority Data

Dec. 16, 1994 [JP] Japan .................. 6-312938

[51] Int. Cl.⁶ .................. G06F 15/40
[52] U.S. Cl. .................. 395/326; 395/336; 395/978
[58] Field of Search .................. 395/326, 336, 395/337, 338, 339, 340, 347

[56] References Cited

U.S. PATENT DOCUMENTS

| | | | |
|---|---|---|---|
| 4,567,610 | 1/1986 | McConnell | 382/18 |
| 4,859,996 | 8/1989 | Adler et al. | 340/712 |
| 5,241,671 | 8/1993 | Reed et al. | 395/337 |
| 5,395,243 | 3/1995 | Lubin et al. | 395/337 |
| 5,412,738 | 5/1995 | Brunelli et al. | 382/115 |
| 5,436,637 | 7/1995 | Gayraud et al. | 395/339 |
| 5,488,686 | 1/1996 | Murphy et al. | 395/340 |
| 5,521,981 | 5/1996 | Gehring | 381/17 |
| 5,539,869 | 7/1996 | Spoto et al. | 395/336 |

*Primary Examiner*—Raymond J. Bayerl
*Assistant Examiner*—Steven P. Sax
*Attorney, Agent, or Firm*—Antonelli, Terry, Stout, & Kraus, LLP

[57] ABSTRACT

The present invention relates to a method of generating sounds by a graphical user interface (GUI) used on information processing apparatuses and computers and, more particularly, to a method of acoustically expressing image information to enable visually disabled people having difficulty in using GUI to operate apparatuses with GUI, and an apparatus for carrying out the method. A specific sound is assigned before hand to an object displayed in a drawing space on a display screen or the like, and the object is expressed acoustically by generating the sound by a sound generating device for a period of time corresponding to the length of the outline of the object, the travel of the object or the ratio of change in size of the object.

17 Claims, 15 Drawing Sheets

| OBJECT | FREQ.[Hz] | TIMBRE |
|---|---|---|
| TRIANGLE | 440 | TRIANGLE |
| RECTANGLE | 880 | FLUTE |
| CIRCLE | 1760 | CONGA |
| LINE SEGMENT | 3520 | GUITAR |
| ⋮ | ⋮ | ⋮ |

FIG. 6

| OBJECT | POSITION | FREQ.[Hz] | TIMBRE |
|---|---|---|---|
| TRIANGLE | CONTOUR | 440 | TRIANGLE |
| | APEX | 660 | |
| | CENTER OF GRAVITY | 550 | |
| RECTANGLE | CONTOUR | 880 | FLUTE |
| | APEX | 1320 | |
| | CENTER OF GRAVITY | 1100 | |
| CIRCLE | CONTOUR | 1760 | CONGA |
| | APEX | 2640 | |
| | CENTER OF GRAVITY | 2200 | |
| LINE SEGMENT | CONTOUR | 3520 | GUITAR |
| | APEX | 5280 | |
| | CENTER OF GRAVITY | 4400 | |
| ⋮ | ⋮ | ⋮ | ⋮ |

METHOD OF ACOUSTICALLY EXPRESSING IMAGE INFORMATION

BACKGROUND OF THE INVENTION

The present invention relates to a method of generating a sound by a graphical user interface (GUI) used on information processing apparatuses and computers and, more particularly, to a method of acoustically expressing image information to enable visually disabled people having difficulty in using GUI to operate apparatuses with GUI, and an apparatus for carrying out the method.

User interfaces have been improved to improve the facility of using advanced information processing apparatuses including computers and communication terminal equipment. The use of GUI that displays the data structure of files and directories stored in computers and operating procedures on the screen of a display in pictures symbolizing practical working environment has become prevalent. GUI that facilitate intuitive understanding is one of techniques that facilitate the operation of information processing apparatuses.

Meanwhile, the development of electronic information coding technology and speech synthesizing technology has made possible easily converting electronic character information into speech information, which has enhanced chances for visually disabled people to use information processing apparatuses. Visually disabled people are able to computers provided with a character terminal because characters can be converted into speech information. However, the development of GUI has reduced the ratio of text in displayed information and has made it difficult to convert the state of a screen into speech, which is a main cause that hinders visually disabled people from using information processing apparatuses.

A method to overcome such a difficulty expresses an object assigns pieces of language representing the attributes of the object, such as the shape and the color, and reads the pieces of language by a speech synthesizing technique to covert the position and shape of the object displayed in a drawing space, such as a display screen into acoustic information.

The position of an object in a drawing space can be expressed by a spatial sound image localizing technique mentioned, for example, in "Onzo Seigyo Gijutsu"; Komiyama; Terebijon Gakkai-shi, Vol. 46, No. 9, pp. 1076–1079 (1992).

SUMMARY OF THE INVENTION

The prior art method of expressing the attributes of an object in speech is able to express only objects having attributes, such as shape and color, to which pieces of speech are assigned beforehand and unable to express objects of optional shapes having sizes difficult to express, made by the user.

The method employing the spatial acoustic image localizing technique in expressing the spatial position of an object has difficulty in expressing the position of an object in a comparatively small space, such as a display combined with a computer, in a desired resolution and a desired sound source separation.

With those problems in view, the present invention assigns specific sounds beforehand to the attributes of an object in a drawing space and employs a means for generating the sounds for set periods of time corresponding to the length of the outline of the object, the positions of the vertices of the object and the like, a means for generating a sound for a set period of time corresponding to the travel of the object, a means for generating a sound for a set period of time corresponding to the ratio of change in the size of the object, a means for generating a sound representing the gradation of the color of the object, a means for generating a sound corresponding to the position of the object in a drawing space, and a means for locating a sound representing the attribute of the object in a drawing space in a specific position in an acoustic space.

The preparatory assignment of the specific sounds to the attributes of the object in a drawing space and the generation of the sounds for set periods of time corresponding to the length of the outline and the position of the vertex of the object enables the acoustic expression of the shape of the object. The generation of the sound for a set period of time corresponding to the travel of the object enables the acoustic expression of the travel. The generation of the sound for a set period of time corresponding to the ratio of change in size of the object enables the acoustic expression of change in size of the object. The generation of a specific sound corresponding to the gradation of the color of the object enables the acoustic expression of the density of the color of the object. The generation of a sound corresponding to the position of the object in a drawing space enables the acoustic expression of the position of the object. The localization of the sounds representing the attributes of the object in a drawing space at specific positions in an acoustic space enables the simultaneous expression of detailed information about the shape and the size of the object and information about the position of the object.

Further advantages of the present invention will become apparent to those with ordinary skill in the art upon reading and understanding the following detailed description of the preferred embodiments.

BRIEF DESCRIPTION OF THE DRAWINGS

The invention will be described in conjunction with certain drawings which are for the purpose of illustrating the preferred embodiments of the present invention only and not for the purpose of limiting the same, and wherein:

FIG. 6 is a look-up table to be used for assigning different tones to different parts of an object;

DETAILED DESCRIPTION OF THE PREFERRED EMBODIMENTS

Figure 1:
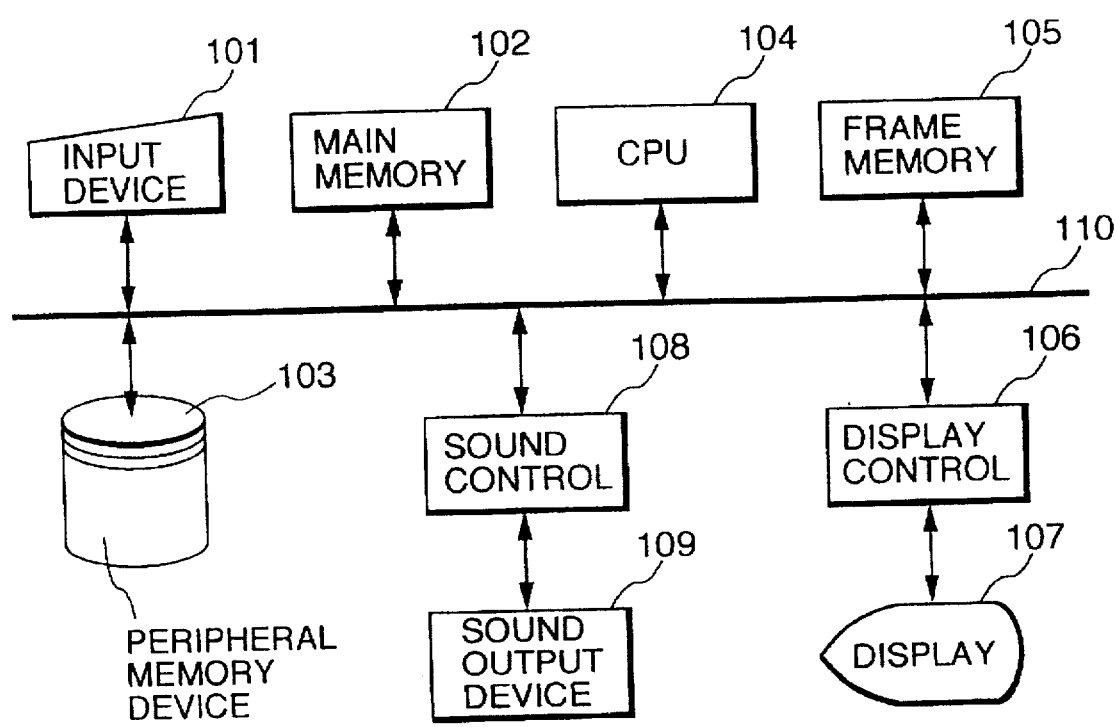
FIG. 1 is a block diagram of a system for carrying out a method of acoustically expressing an image in a preferred embodiment according to the present invention.

Referring to FIG. 1 showing a system for carrying out a method of acoustically expressing an image in a preferred embodiment according to the present invention, there are shown an input device 101, such as a keyboard, a mouse, a tablet, a track ball, a touch panel, a data pen, a microphone or a combination of those devices, a main storage 102 for storing control programs and data for controlling the system, an external storage 103, a CPU 104 for controlling the system, a display 107, a frame memory 105 for storing display data for displaying a bit map image calculated by the CPU 103 on the display 107, a display controller 106 for controlling the display 107 to display the display data stored in the frame memory 105, a sound output device 109, a sound controller 108 for controlling the sound output device 108 to generate sounds, and a bus 110 for transferring data between those components of the system. Apparatuses comprising at least the functional components shown in FIG. 1 include personal computers supported by a multiwindow system and work stations.

Figure 2:
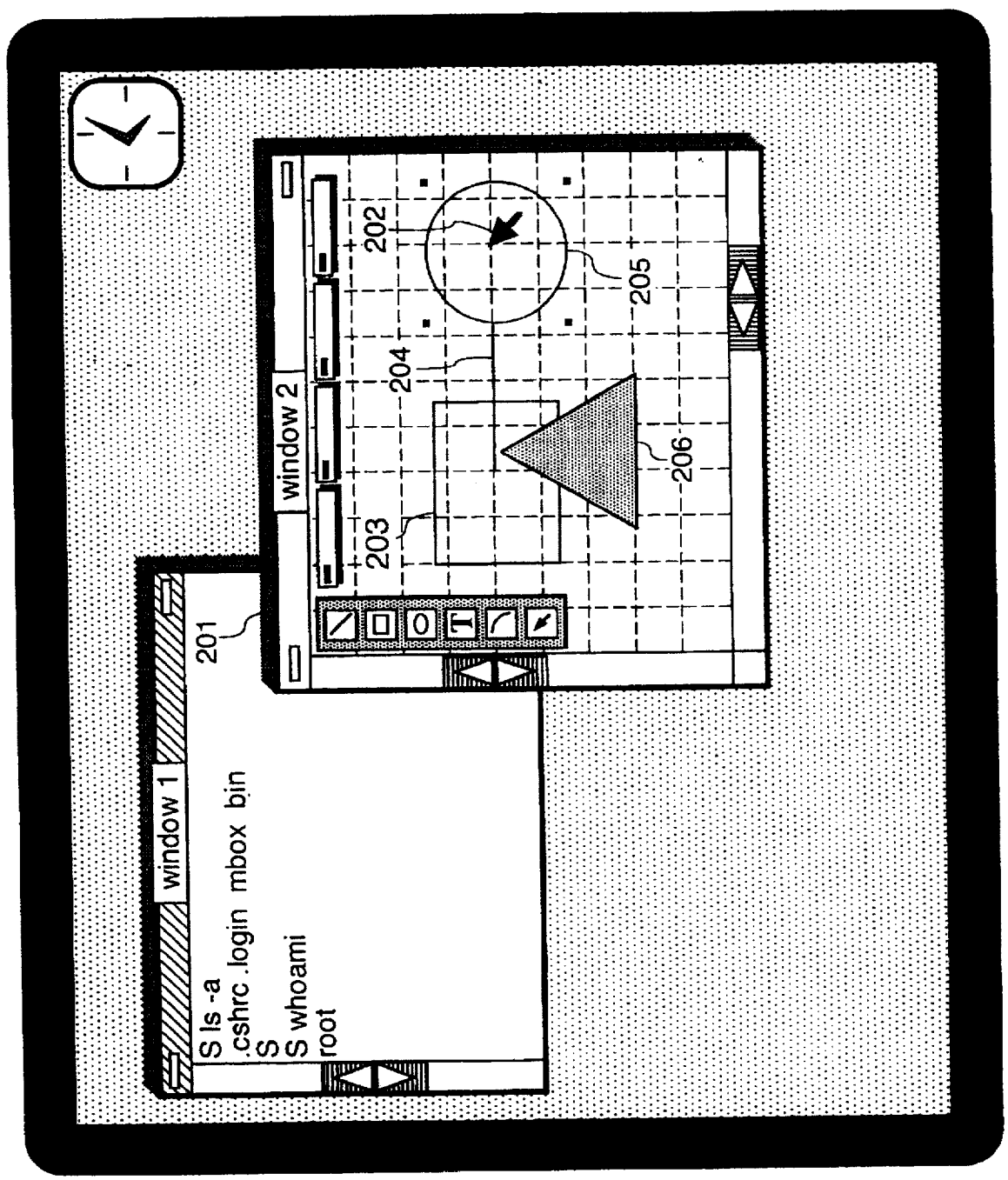
FIG. 2 is a pictorial view of an example of a displayed object.

FIG. 2 shows an object displayed in a multiwindow system on the display 107 of the system of FIG. 1. A clear-sighted user moves a cursor 202 on the bit map image of patterns displayed in a window by operating a pointing device, such as a mouse, to edit patterns including a rectangle 203, a line segment 204, a circle 205 and a triangle 206. However, a visually disabled user, particularly, a seriously disabled user or a blind user, is incapable of visually recognizing the bit map image displayed on the screen. The present invention employs an audio feedback means to enable the visually disabled user to operate the window system without relying on visual information for requesting displaying information on the screen, entering data and editing data. The acoustic information expressing method of the present invention is capable of using image information in combination with acoustic information, and the use of image information and acoustic information in combination will facilitate the operation of the window system by a clear-sighted user.

Figures 3, 4:
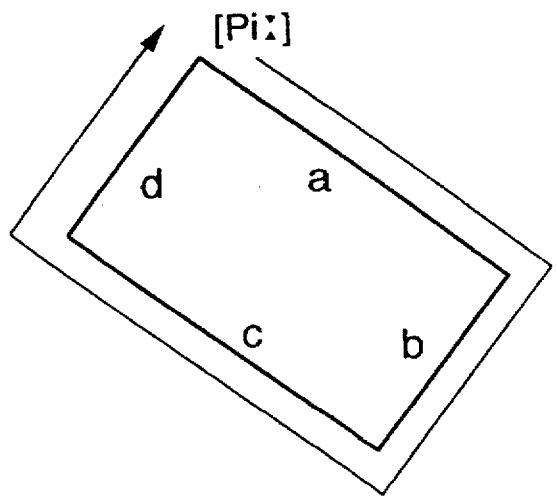
FIG. 3 is a diagrammatic view of assistance in explaining a method of acoustically expressing the outline of an object.
FIG. 4 is a look-up table showing objects and corresponding timbre.

FIG. 3 shows one of the objects for graphic data editing application as shown in FIG. 2. When the size of the entire drawing space is fixed, the relative size of the object can be uniquely determined. In FIG. 3, the object is a quadrilateral having sides of lengths a, b, c and d. Therefore, the length L of the outline of the object is:

$$L = a + b + c + d \tag{1}$$

An input device, such as a mouse, is operated to specify a specific position on the drawing space. For example, when a position indicator, such as a cursor, is moved by operating the input device and the object shown in FIG. 3 is specified by locating the indicating point of the cursor in the object, the system identifies the specified object from positional information provided by the cursor. For this purpose, reference may be made to output information on the screen. The output information indicates the object and the position of the object on the screen. When the object is specified by the cursor, an output sound is assigned to the object with reference to a look-up table shown in FIG. 4 prepared beforehand. Since the object shown in FIG. 3 is a rectangle, a sound of the flute of a timbre of 880 Hz in pitch is assigned to the object. The sound assigned to the object is generated for a period t of time proportional to the length L of the outline of the object.

$$t = kL \tag{2}$$

where k is a proportional constant.

Other sounds assigned to objects for the acoustic expression of the objects are shown in FIG. 4. The shapes of the objects are identified by pitches (frequency) and tones of the sounds, respectively. The sounds to be assigned to those objects may be the same pure sounds of different pitches or may be sounds of the same pitch and different tones. Band noises of different bandwidths or different center frequencies may be used instead of musical instrument tones employed in this embodiment.

The sound may be assigned to an object and generated upon the selection of the object by a known method of a window system by depressing a specific key of a keyboard to select the object according to an optional predetermined rule. For example, the positions of a plurality of objects in the drawing space can be expressed by assigning numbers to the plurality of objects in the drawing space according to the distances from a specified position in the drawing space and successively generating the sounds assigned to the objects according to the order of the numbers assigned to the objects when displaying the objects on the screen in response to the user's request to display the objects. This timing of sound generation is applicable to the following embodiments.

Figure 5A:
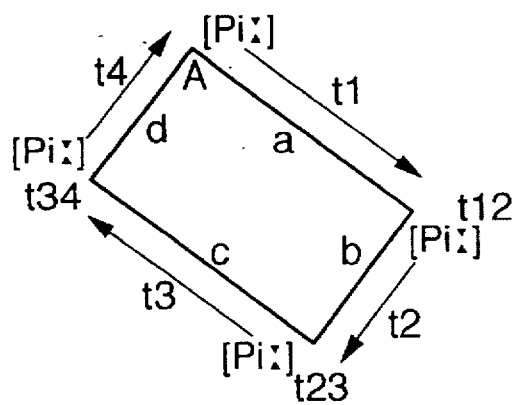
FIGS. 5A, 5B and 5C are diagrammatic views of assistance in explaining methods of acoustically expressing the outlines and the vertices of objects.
Figure 5B:
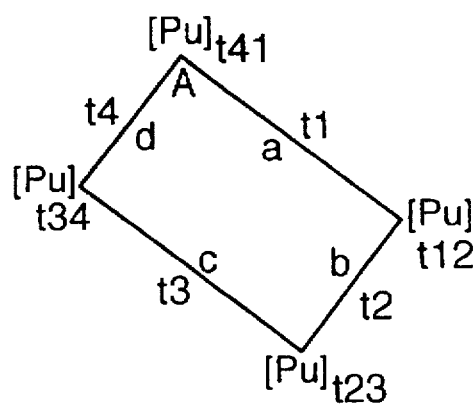
Figure 5C:
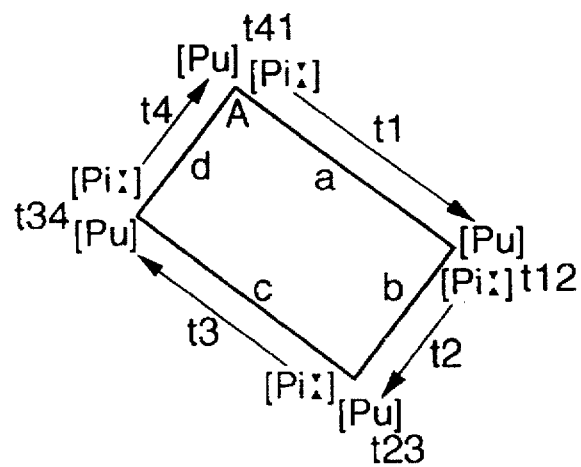

In examples shown in FIGS. 5A, 5B and 5C, the sound is generated in different modes for the outline and the vertices of the object. Similarly to the example explained with reference to FIG. 3, a sound is assigned to a specified object. Reference is made to the look-up table shown in FIG. 4 or a look-up table shown in FIG. 6 for selecting a sound to be assigned to the object.

In the example shown in FIG. 5A, the generation of the sound assigned to the outline is interrupted at time positions corresponding to the positions of the vertices for a time specified to the vertices. In this case the generation of the sound assigned to the object is started at a point A, continued for a time t1, interrupted for a time t12, continued for a time t2, interrupted for a time t23, continued for a time t3, interrupted for a time $t_{34}$, and then continued for a time t4. Suppose that the lengths of the sides of the object are a, b, c and d, and a value corresponding to the length of the vertices is q. Then, $$t1 = ka \qquad (3)$$

$$t2 = kb \qquad (4)$$

$$t3 = kc \qquad (5)$$

$$t4 = kd \qquad (6)$$

$$t12 = t23 = t34 = kq \qquad (7)$$

In the example shown in FIG. 5B, the sound is generated only at time points corresponding to the vertices of the object. The sound generation is continued for a time t41, interrupted for a time t1, continued for a time t12, interrupted for a time t2, continued for a time t23, interrupted for a time t3 and continued for a time t34. The times t1, t2, t3 and t4 are expressed by Expressions (3) to (6), respectively, and the times t41, t12, t23 and t34 are expressed by:

$$t41 = t12 = t23 = t34 = kq \qquad (8)$$

In the example shown in FIG. 5C, the sound is generated for both the sides and the vertices for times t41, t1, t12, t2, t23, t3, t34 and t4, respectively. The times t1, t2, t3, and t4 are expressed by Expressions (3) to (6), respectively, and the times t41, t12, t23 and $t_{34}$ are Expressed by expression (8). In the example shown in FIG. 5C, sounds of different tones must be assigned to the sides and the vertices to discriminate between the sides and the vertices.

Tracing the sides forming the outline in a fixed order facilitates the recognition of the shape of the object. For example, the outline of the object is traced according to a tracing rule that gives priority to the left vertex, the upper vertex, the right vertex and the lower vertex in that order as a starting vertex and specifies clockwise tracing.

FIG. 6 is a look-up table showing objects of different shapes and sounds assigned to the parts of those objects. As shown in FIG. 6, different parts, such as the outline and the vertex, of an object are discriminated from each other by sounds of the same timbre and different pitches. When the sound is interrupted at time positions corresponding to the vertices as explained with reference to FIG. 5A, sounds for specifying the vertices need not be used. It is preferable for satisfactory hearing to determine selectively the pitches of the sounds to be assigned to the parts of an object so that the sounds are in consonant relation. When the object has a shape not having any vertex, such as a circle or the like, the vertices of a circumscribed rectangle are used as the virtual vertices of the object. For an object not having any vertex, a starting position is determined on the outline according to the previously mentioned order of priority.

Figure 7A:
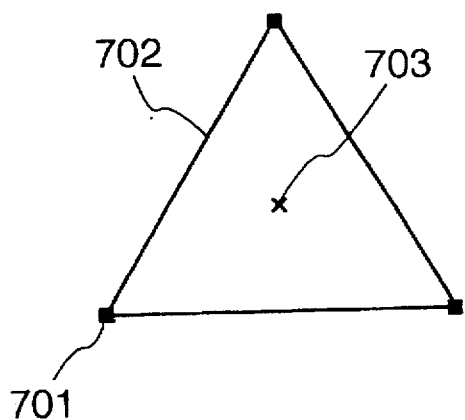
FIGS. 7A, 7B, 7C and 7D are diagrammatic views of objects.
Figure 7B:
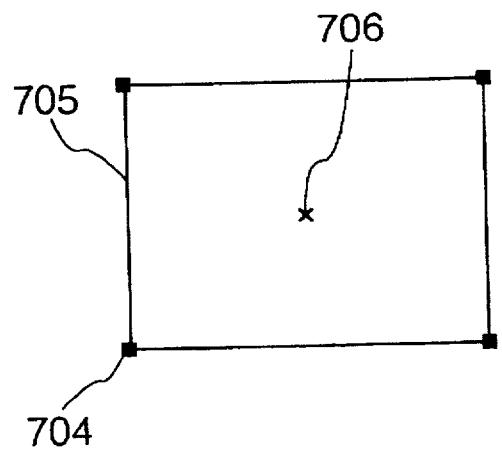
Figure 7C:
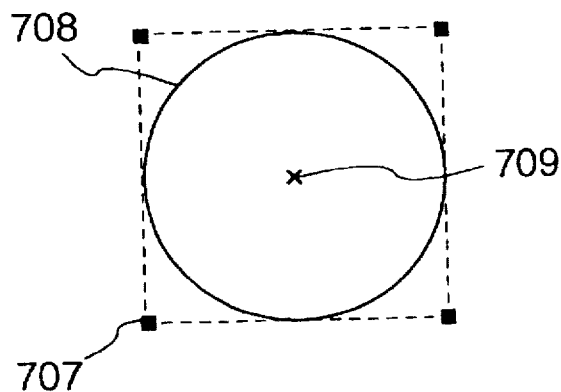
Figure 7D:
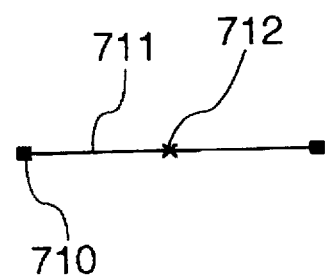

FIGS. 7A, 7B, 7C and 7D show representative objects, i.e., a triangle, a rectangle, a circle and a line segment, respectively. In FIGS. 7A to 7D, indicated at 701, 704, 707 and 710 are the respective vertices of the objects, at 702, 705, 708 and 711 are the respective outlines of the objects, and at 703, 706, 709 and 712 are the respective centers of gravity of the objects. Predetermined sounds assigned to the centers of gravity are shown in FIG. 6. In this embodiment, the line segment interconnecting vertices as shown in FIG. 7D is also called an outline.

Although the method of expressing specified pictures as an object in the screen has been described, the system may determine an expressing method beforehand or the system may determine only a basic output method and the user may specify an expressing method when the user uses the system.

Figure 8:
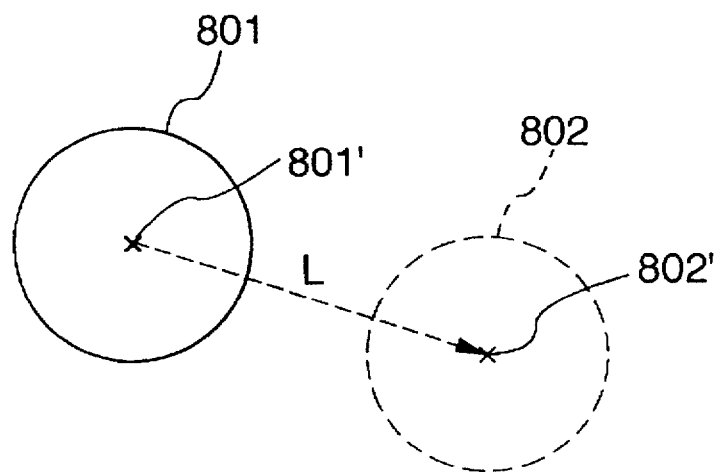
FIG. 8 is a diagrammatic view of assistance in explaining a method of acoustically expressing the movement of an object.

FIG. 8 is a view of assistance in explaining the acoustic expression of the movement of an object. When the object moves, a sound of a tone assigned to the center of gravity of the object as shown in FIG. 6 is generated for a time t expressed by Expression (1) proportional to the travel L of the object, i.e., the distance between the position 801' of the center of gravity of the object 801 before movement and the position 801" of the center of gravity of the object 801 after movement.

Figure 9:
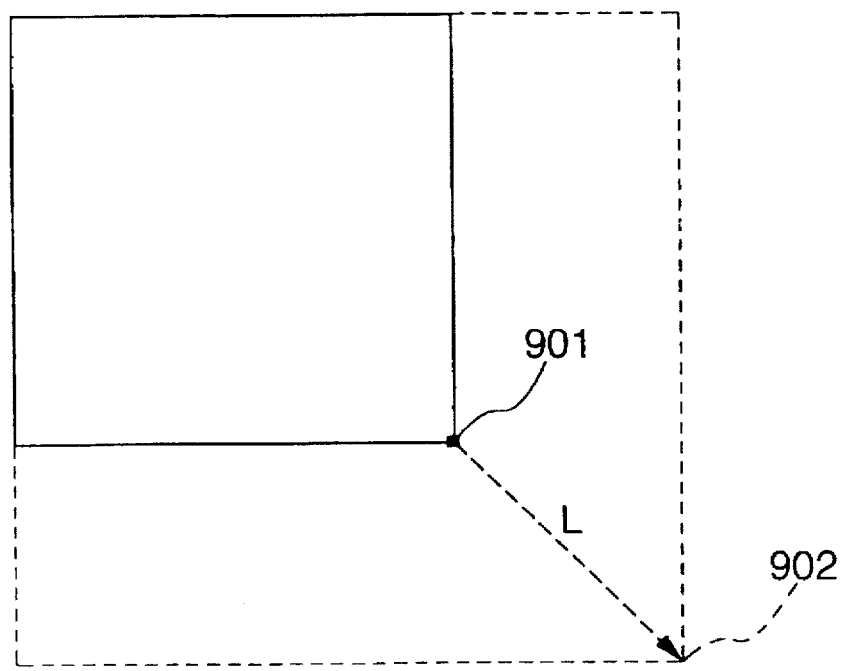
FIG. 9 is a diagrammatic view of assistance in explaining a method of acoustically expressing a change in size of an object.

FIG. 9 is a view of assistance in explaining the acoustic expression of a change in the size or the shape of an object. When the object is enlarged, diminished or deformed, a sound of a tone shown in FIG. 6 is generated for a time t proportional to the distance L between the position 901 of a vertex that moves along a path closest to the direction of enlargement, diminution or deformation of the object before enlargement, diminution or deformation and the position 902 of the same vertex after enlargement, diminution or deformation. The time t is expressed by Expression (1).

The operations shown in FIGS. 8 and 9 are executed by the following methods. The object selected by operating the indicating device, such as the mouse, or the keyboard is dragged by operating the mouse or by striking the move key repeatedly. The selected object is enlarged or diminished by entering numerical values. The selected object is deformed by specifying a vertex to be fixed and then dragging the rest of the vertices by operating the mouse.

Figure 10A:
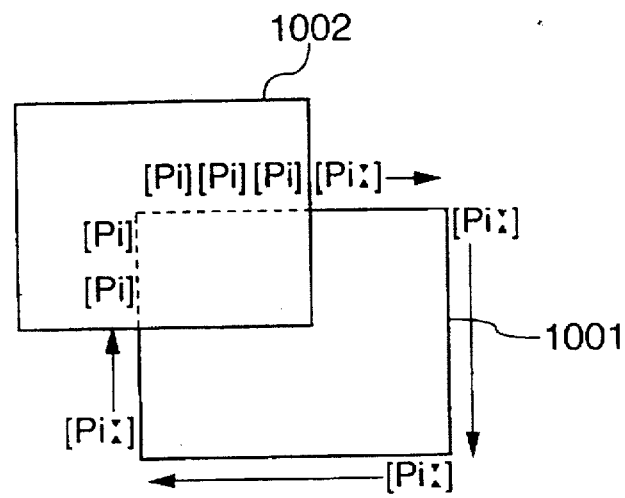
FIGS. 10A and 10B are diagrammatic views of assistance in explaining methods of acoustically expressing partly covered objects.
Figure 10B:
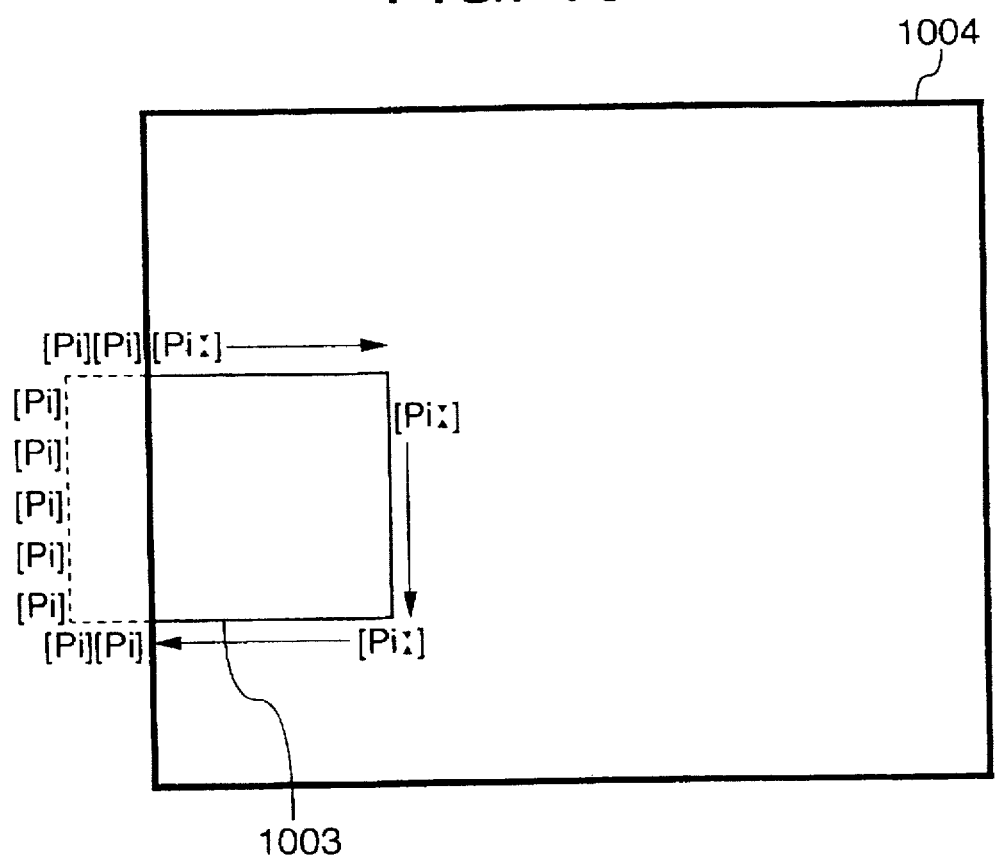
Figures 11A, 11B, 11C, 11D:
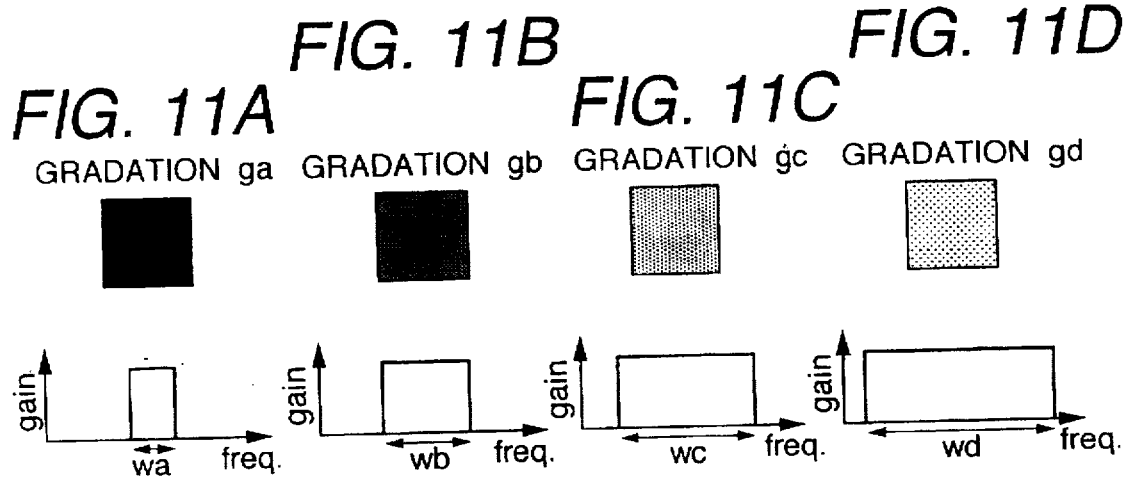
FIGS. 11A, 11B, 11C and 11D are diagrammatic views of assistance in explaining methods of acoustically expressing the gradation of objects.

FIG. 10A shows an object 1001 to be acoustically expressed partly covered with an obstacle 1002, and FIG. 10B shows an object 1003 partly projecting outside the display area 1004 of a screen or a window. When expressing such objects by generating a sound assigned to the outline, the sound is generated for a time corresponding to the invisible portion of the object in a sound generating mode different from a sound generating mode in which the sound is generated for the visible portions of outline of the object. In the case of FIG. 10A, the sound is generated continuously for the visible portions of the outline and the sound is generated intermittently for the invisible portions of the outline. Thus, the invisible portions of the outline are expressed by the sound. When the vertices are expressed by the interruption of the sound as shown in FIG. 5A, the vertices are identified by interrupting the sound for a time different from the time for the interruption of the intermittent sound. It is possible to express the invisible portion of the outline by using a sound obtained by modifying the sound for expressing the outline by a low-pass filter or the like for a time corresponding to the invisible portion.

Thus, the position and the shape of objects can be acoustically expressed by the foregoing methods.

A method of acoustically expressing the color density of an object will be described with reference to FIGS. 11A to 11D. The color density is expressed by gradation herein. When the object has more than one color, the average gradation or the gradation of a color holding the widest area is regarded as the gradation of the object. When the object is hatched, a gradation corresponding to the average gradation of each pixel of those in the object is employed. For example, the respective gradations of objects as shown in the upper parts of FIGS. 11A, 11B, 11C and 11D are expressed by generating band noises having bandwidths proportional to those gradations, respectively, for a fixed time. In the lower parts of FIGS. 11A to 11D, frequency is measured on the horizontal axes. Band noises having a wider bandwidth are assigned to higher gradations in this embodiment. Gradations may be expressed by any corresponding output sounds, respectively. In this embodiment, bandwidths are assigned to gradations, respectively. When gradation g is represented by an integer meeting Expression (9), bandwidth w is calculated by using Expression (10).

$$0 \leq g \leq G \quad (9)$$

$$w = \frac{W}{G-1} \cdot g \quad (10)$$

where G is an integer and W is a maximum bandwidth.

Figure 12:
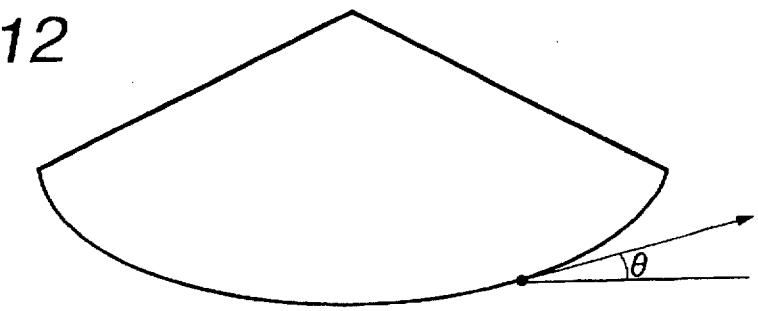
FIG. 12 is a diagrammatic view of assistance in explaining a method of acoustically expressing the inclination of the outline of an object.

FIG. 12 illustrates a method of acoustically expressing the shape and the direction of extension of the outline of an object by varying the tone of a sound according to the gradient of the outline of the object. The angle θ (rad) of a tangent to the outline at a point on the outline to a horizontal line is the gradient of the outline at the point. Therefore, the gradient of the outline is 0° (θ=0 rad) when the outline is a horizontal line segment extending from left to right and is −90° (θ=−π/2 rad) when the outline is a vertical line segment extending down. When a sound of a pitch F0 is assigned to the outline of an object and range of variation is 2aF0, pitch frequency f is expressed by:

$$f = F0 \times \left(1 + a - \frac{|\theta|}{\pi} \cdot 2a\right) \quad (11)$$

$$-\pi \leq \theta \leq \pi \quad (12)$$

where a is a constant value.

the pitch frequency of a complex sound can be changed by a method mentioned in "Pitch-Synchronous Waveform Processing Techniques for Text-to-Speech Synthesis Using Diphones:, Charpentier and Moulines; Eurospeed 89, Vol. 2, pp. 13–19 (Sept., 1989).

Figure 13:
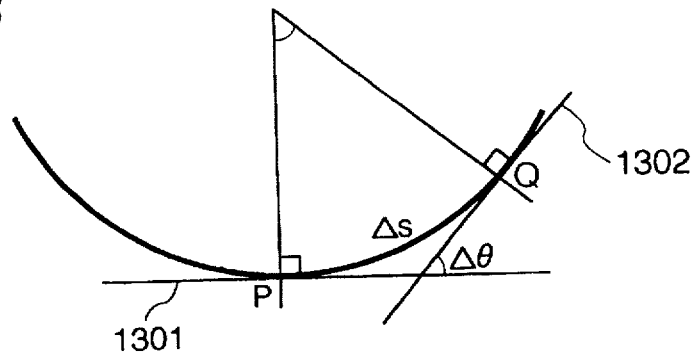
FIG. 13 is a diagrammatic view of assistance in explaining a method of acoustically expressing the curvature of an object.

FIG. 13 illustrates a method of acoustically expressing the shape and the direction of extension of the outline of an object by varying the tone of a sound assigned to the outline according to the curvature of the outline. Curvature C is expressed by:

$$C = \lim_{\Delta s \to 0} \frac{\Delta \theta}{\Delta s} \quad (13)$$

where Δθ is the angle between a tangent 1301 to the outline at a point P and a tangent 1302 to the outline at a point Q, and Δs is the length of a portion between the points P and Q of the outline; that is, curvature C is the limit of Δθ/Δs as Δs approaches zero. The curvature C of a circular arc is the reciprocal of the radius of the circular arc. When the curvature is a sufficiently large curvature Ca, $$f = F0 - \frac{F0 - Fa}{Ca} C \quad (14)$$

where f is pitch frequency, Fa is a pitch frequency for the curvature Ca, and F0 is a pitch frequency when C=0, i.e., when the outline is a line segment.

Figure 14:
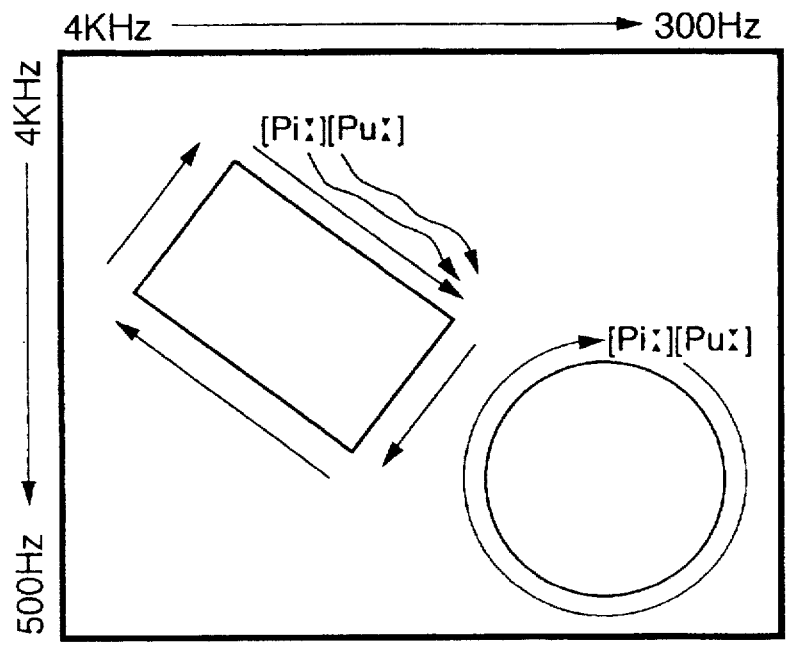
FIG. 14 is a diagrammatic view showing acoustic expressions of positions in a drawing space.
Figure 15:
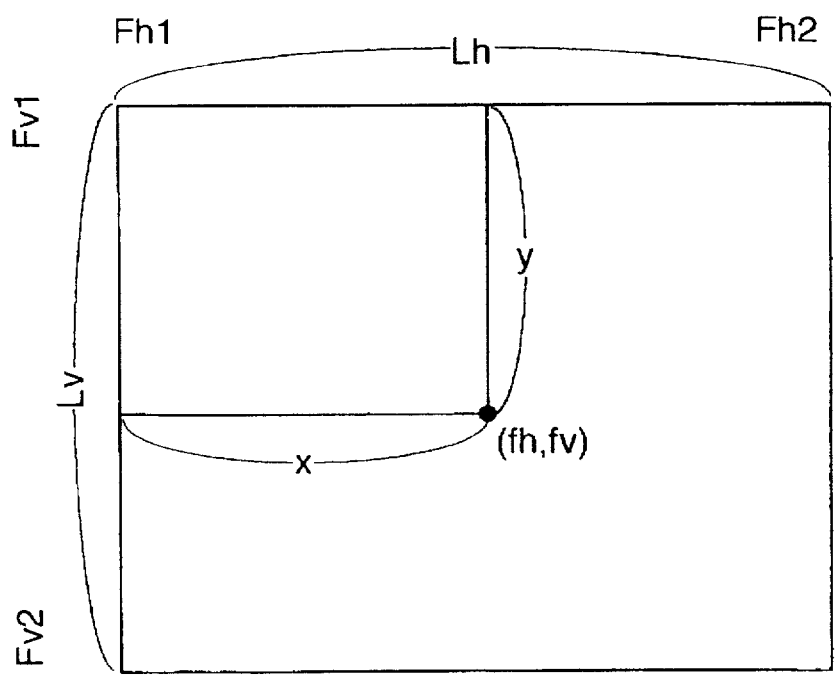
FIG. 15 is a diagrammatic view showing the relation between the pitch of a sound and a position in a drawing space.

A method of acoustically expressing the shape and the position of an object in a drawing space by assigning sounds to coordinate axes defining the drawing space will be described with reference to FIG. 14. Sounds respectively having specific tones are assigned to the horizontal and the vertical axis, respectively. The pitch of the sound assigned to the horizontal axis decreases from left to right, and pitch of the sound assigned to the vertical axis decreases down. FIG. 15 illustrates the relation between a position in the drawing space and the pitch of the sound at the position. The respective pitches fh and fv of the sounds assigned to the horizontal axis and the vertical axis, respectively, are expressed by:

$$fh = Fh1 - \frac{Fh1 - Fh2}{Lh} \cdot x \quad (15)$$

$$fv = Fv1 - \frac{Fv1 - Fv2}{Lv} \cdot y \quad (16)$$

where Fh1 and Fh2 are a maximum and a minimum pitch, respectively, of the sound assigned to the horizontal axis, Fv1 and Fv2 are a maximum and a minimum pitch, respectively, of the sound assigned to the vertical axis, and $L_h$ and $L_v$ are the horizontal and the vertical length, respectively, of the drawing space. The shape of the object and the position of the object in the drawing space are expressed acoustically by generating sounds for the outline and the vertices of the object on the basis of the thus determined relationship by the methods illustrated in FIGS. 3, 5, 8, 9 and 10. The sounds assigned to the horizontal and the vertical axis are those of different musical instruments or band noises of different bandwidths having different timbres.

Incidentally, an application system that handles the objects of a picture individually expresses the picture by using information about the shape and the length of the outline and the position of the vertices. Therefore, the information can be used for generating sounds for the outline. When the objects are not handled individually, the outlines can be extracted by using a method of detecting discontinuity in color density to trace edges mentioned in, for example, "Terebijon Gazo Kogaku Handobukku", Section 5, Chapter 4 (1980). When the objects are not handled individually, the outline of an object indicated by a cursor is extracted by this method and the extracted outline is expressed acoustically the method of the present invention. The vertices can be extracted by detecting discontinuous points in the differential of the extracted outline.

Although the embodiment has been described as applied principally to acoustically expressing pictures in a drawing space, it goes without saying that the embodiment is applicable to acoustically expressing the outline, the vertices, the movement and a change in size of a window of a multiwindow system.

Figure 16:
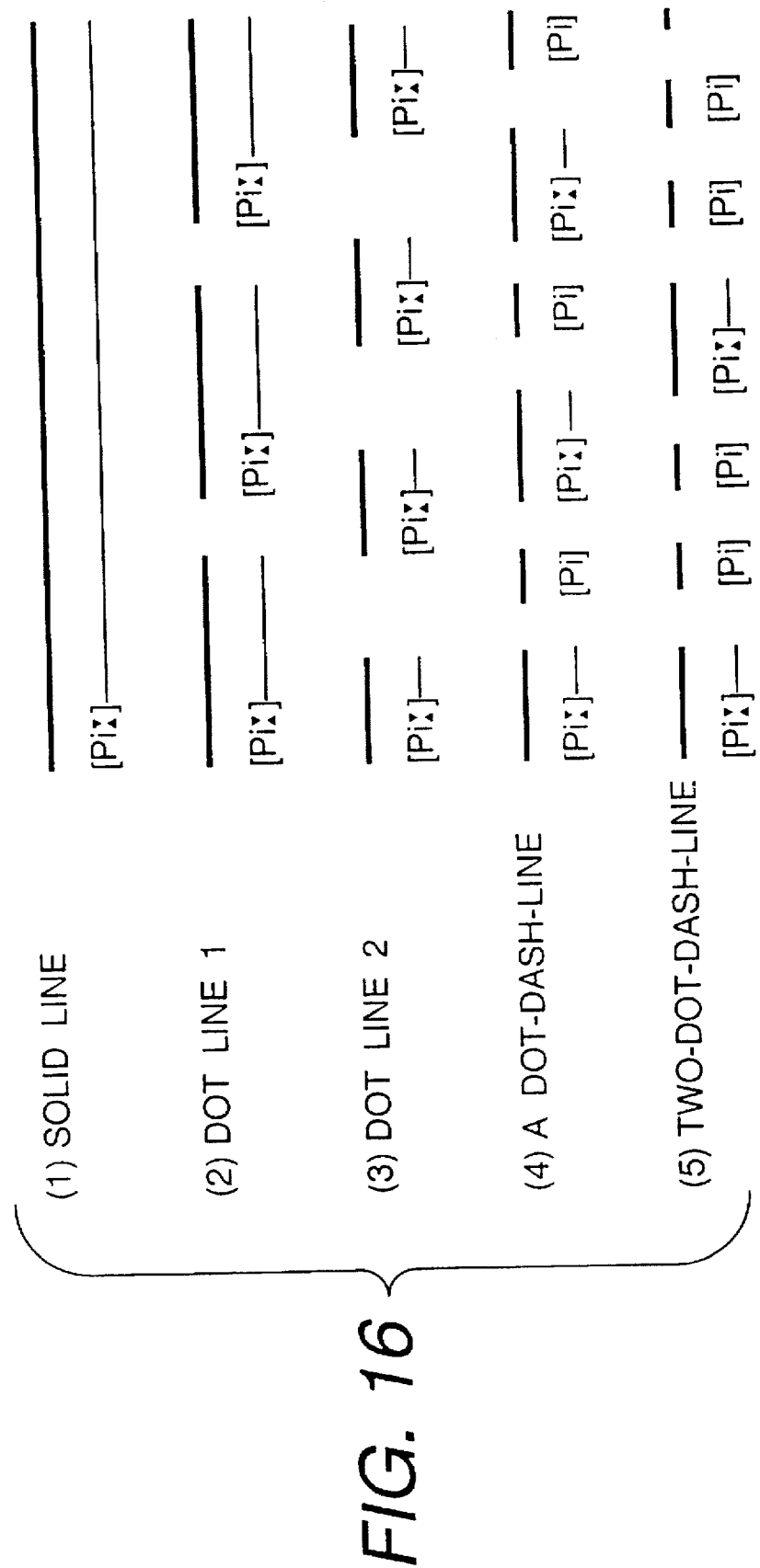
FIG. 16 is diagrammatic view of assistance in explaining a method of acoustically expressing different types of lines.

FIG. 16 illustrates a method of acoustically expressing outlines of different line types. The method generates a sound interrupted according to the mode of interruption of the outline.

Figure 17:
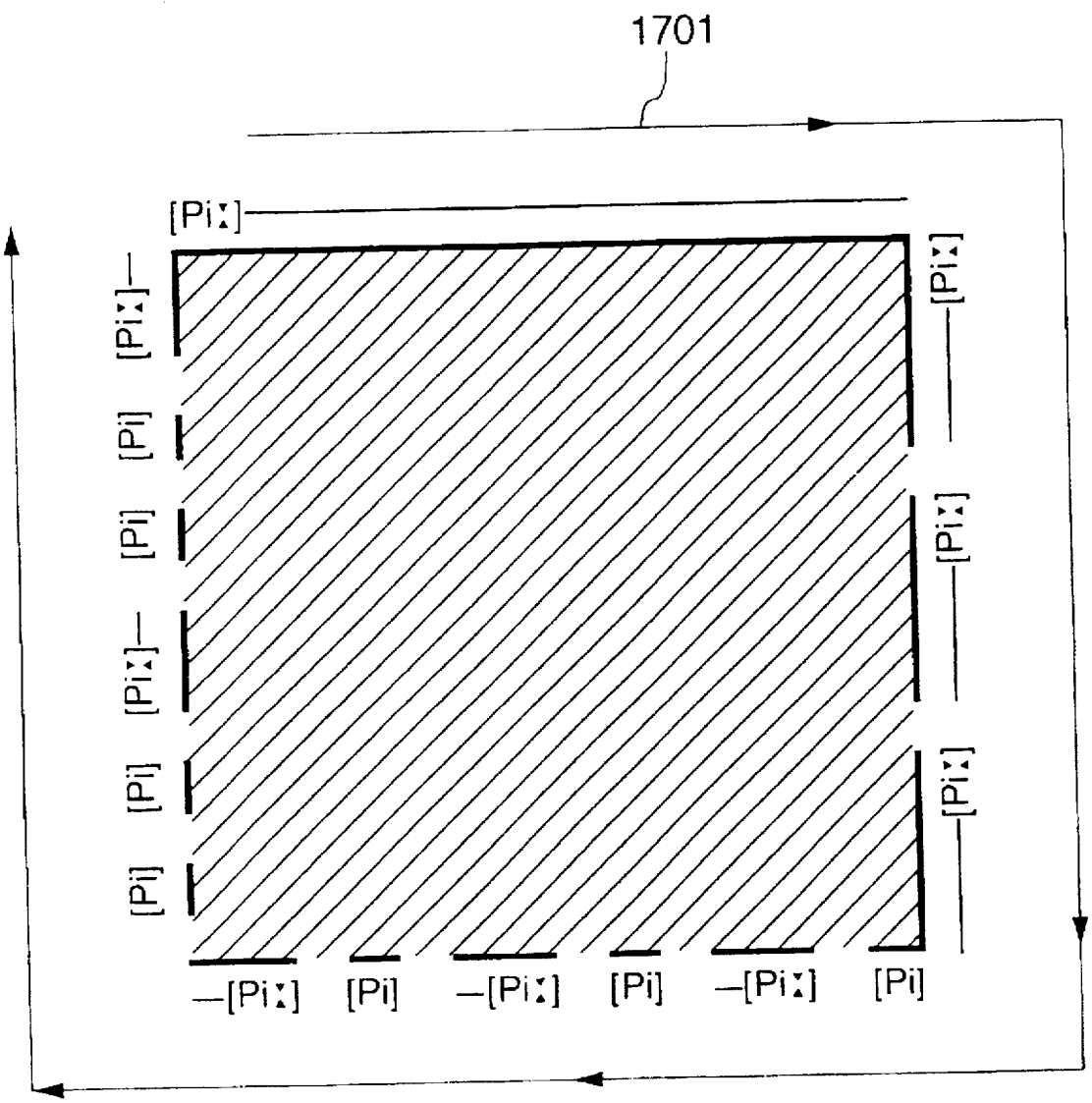
FIG. 17 is a diagrammatic view of assistance in explaining a method of acoustically expressing an object having an outline defined by different types of lines.

FIG. 17 illustrates a method of acoustically expressing an object having an outline consisting of lines of different line types. The method generates an intermittent sound to express the outline acoustically in the directions of the arrows 1701.

Figure 18:
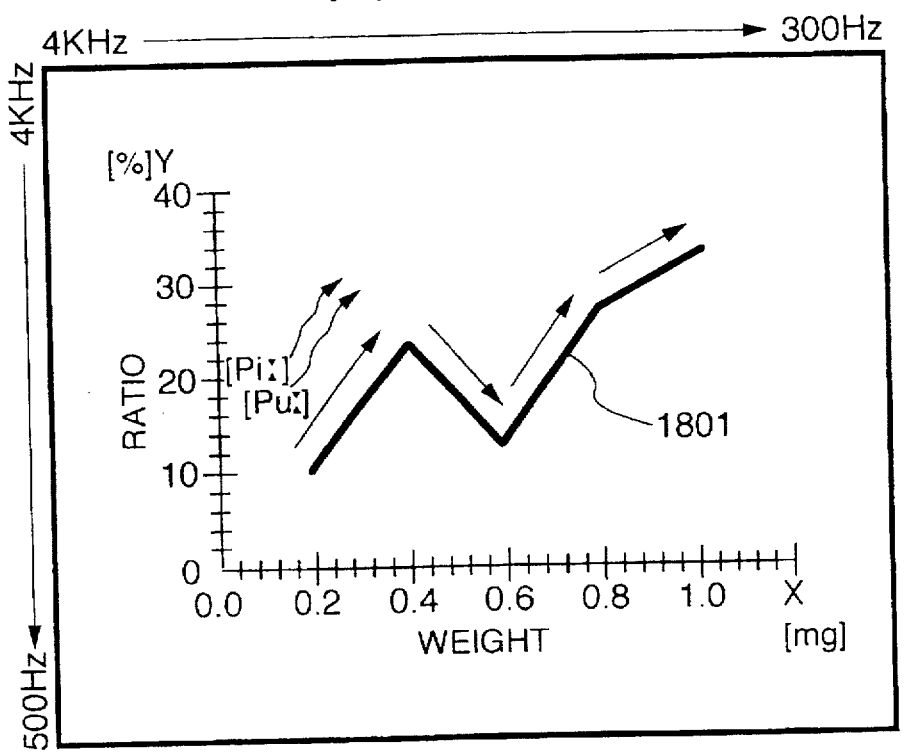
FIG. 18 is a diagrammatic view of assistance in explaining a method of acoustically expressing a broken line of a graph.

FIG. 18 illustrates a method of acoustically expressing a broken line of a graph. This method, similarly to the method illustrated in FIG. 14, assigns sounds to coordinate axes defining a drawing space and expresses the shape of the broken line acoustically by those sounds. For example, when the user requests sound generation, a polygonal line 1801 is selected as the broken line of the graph from an object, and then the shape of the polygonal line is expressed acoustically by the method of the present invention for the understanding of the broken line of the graph. Another method of acoustic expression may assign sounds of different tones to the X-axis which shows weight value and the Y-axis which shows ratio, respectively.

Figure 19:
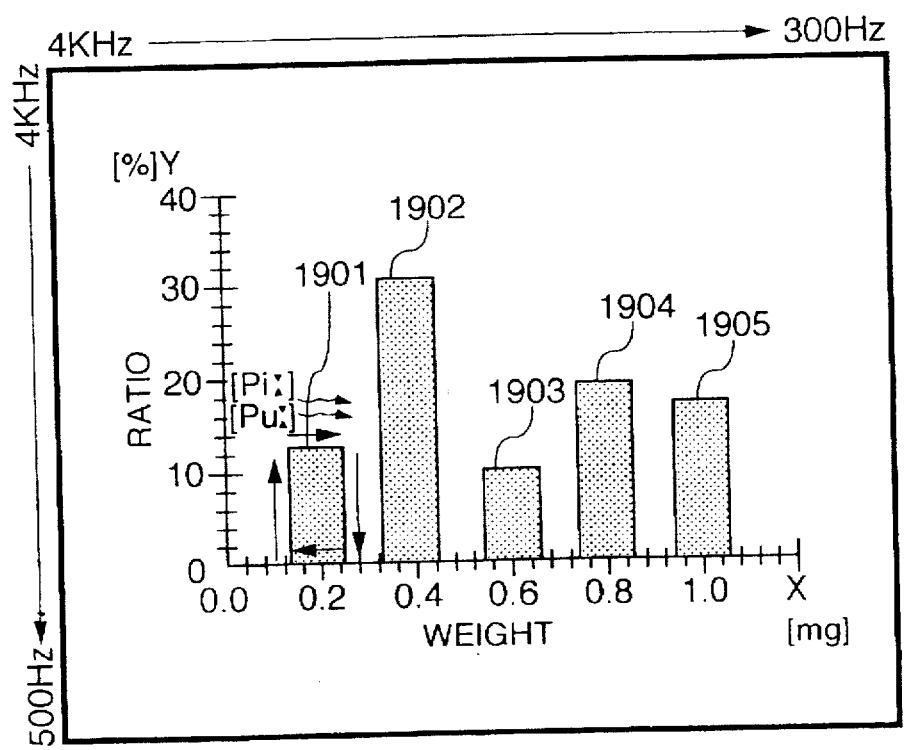
FIG. 19 is a diagrammatic view of assistance in explaining a method of acoustically expressing a bar graph.

FIG. 19 illustrates a method of acoustically expressing a bar graph. This method, similarly to the method illustrated in FIG. 14, assigns sounds to coordinate axes defining a drawing space and expresses the shape of the bar graph acoustically by those sounds. For example, when the user requests sound generation, rectangles 1901 to 1905 are selected sequentially from the object, and the outlines of the rectangles are expressed acoustically by the method of the present invention to express the shape of the bar graph. The shape of the bar graph can be more explicitly expressed by assigning sounds of different tones to the X-axis on which weight is measured to the right and the Y-axis on which ratio is measured upward, respectively.

Figure 20:
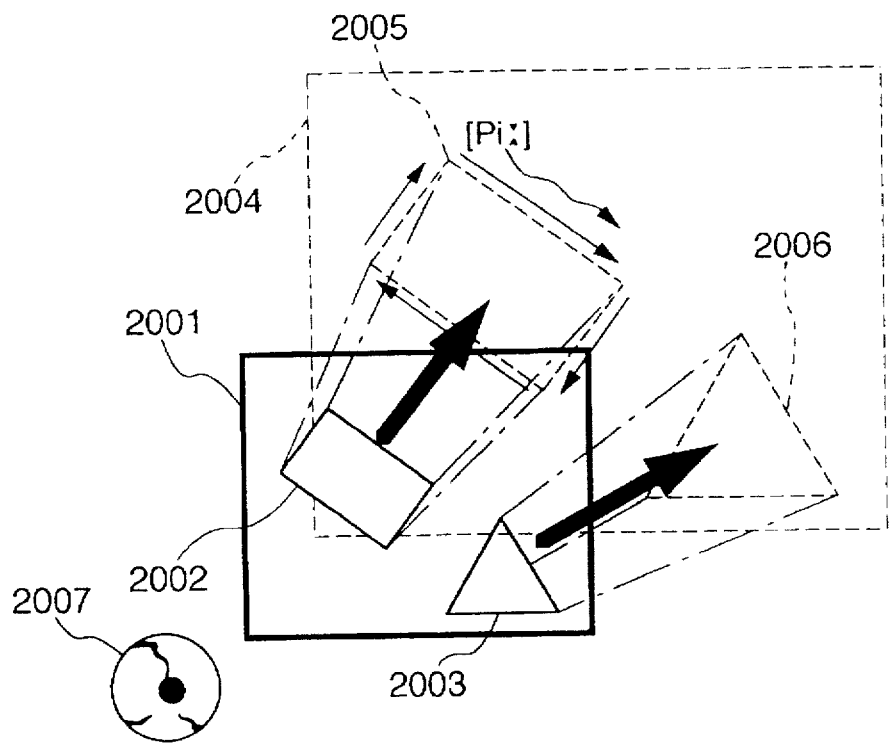
FIG. 20 is a diagrammatic view of assistance in explaining the sound image localization of an object in a drawing space in an acoustic space.

FIG. 20 illustrates a method of expressing an object in a drawing space by sound image localization in an acoustic space. FIG. 20 shows, in a bird's-eye view, a drawing space 2001, i.e., the screen of a display, such as a CRT, and the user 2007, objects 2002 and 2003 are drawn in the drawing space 2001. The coordinates of the objects in the drawing space are associated with coordinates in an acoustic space 2004, and sounds expressing the objects are localized at coordinates 2005 and 2006 in the acoustic space by a method mentioned in, for example, "Onzo Seigyo Gijutsu"; Komiyama; Terebijon Gakkai-shi, Vol. 46, No. 9, pp. 1076–1079 (1992). Sounds for expressing the positions of the centers of gravity, outlines and vertices of the objects are produced by the method illustrated in FIGS. 3, 5, 8, 9 or 10. Suppose that a predetermined sound is generated for a time corresponding to the length of the outline for the object 2002 in the drawing space 2001 by the method previously described with reference to FIG. 3. Since the coordinates defining the outline of the object 2002 correspond uniquely to the time for which the sound is generated according to the outline, the sound is localized at coordinates 2005 in the acoustic space corresponding to the coordinate of a point on the outline of the object 2002 in the drawing space, and the localized position of the sound is varied continuously according to the tracing of the outline by the sound to express the shape and the position of the object acoustically. The methods previously described with reference to FIGS. 5, 8, 9 and 10 also are able to express the shape and the position of the object acoustically by localizing the coordinates of the sound assigned to the object in the drawing space at the corresponding positions in the acoustic space. When the method in FIG. 20 is used, the direction from which the sound can be heard varies according to the position of the object, sounds may be simultaneously generated when a plurality of objects are selected simultaneously.

Figure 21:
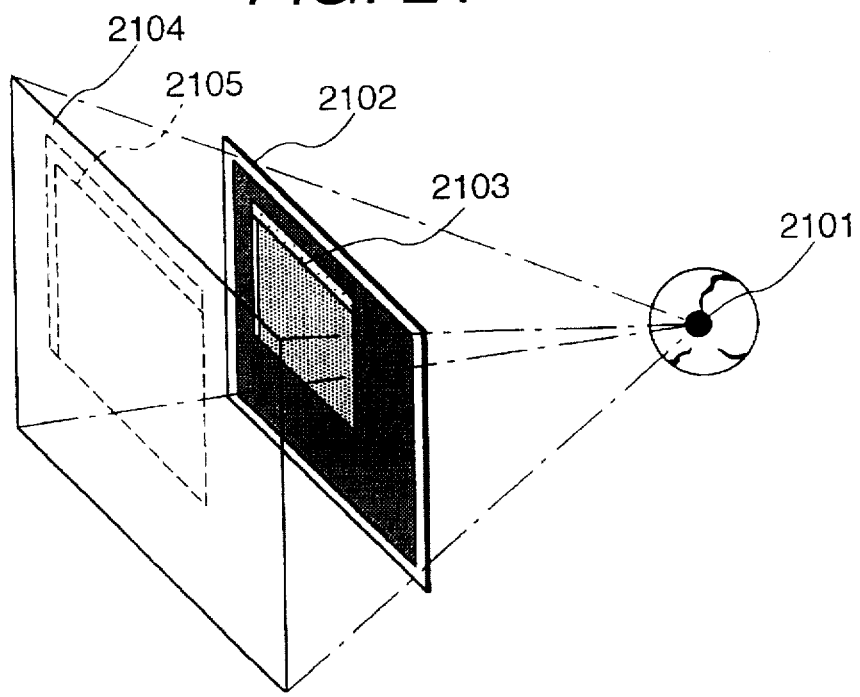
FIG. 21 is a perspective view of assistance in explaining a method of mapping a drawing space and an acoustic space.

When the acoustic space overlaps the drawing space perfectly, the position of the object in the drawing space coincides with the position of a sound source in the acoustic space. When the acoustic space is greater than the drawing space, resolution in acoustic image localization is improved relatively. As shown in FIG. 21, the drawing space can be associated with the acoustic space by setting an origin 2101 at the middle between both the user's ears, and setting the coordinates of an acoustic image 2105 corresponding to an object in an acoustic space 2104 at a geometric position on a prolongation of a straight line interconnecting the origin 2101 and the coordinates of an object 2103 in a drawing space 2102. The mapping of the object in the acoustic space may be deformed so as to conform to the hearing according to the characteristics of the sense of hearing. It goes without saying that this method can be easily applied to a three-dimensional space in an extended mode of application.

Figure 22A:
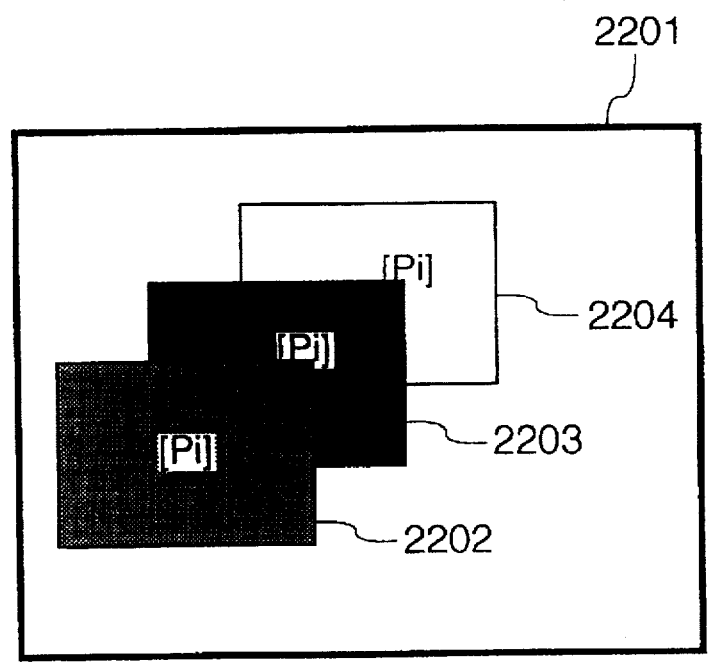
FIGS. 22A and 22B are a diagrammatic view and a perspective view, respectively, of assistance in explaining the sound image localization of objects overlapping in a drawing space in a stereophonic sound space.
Figure 22B:
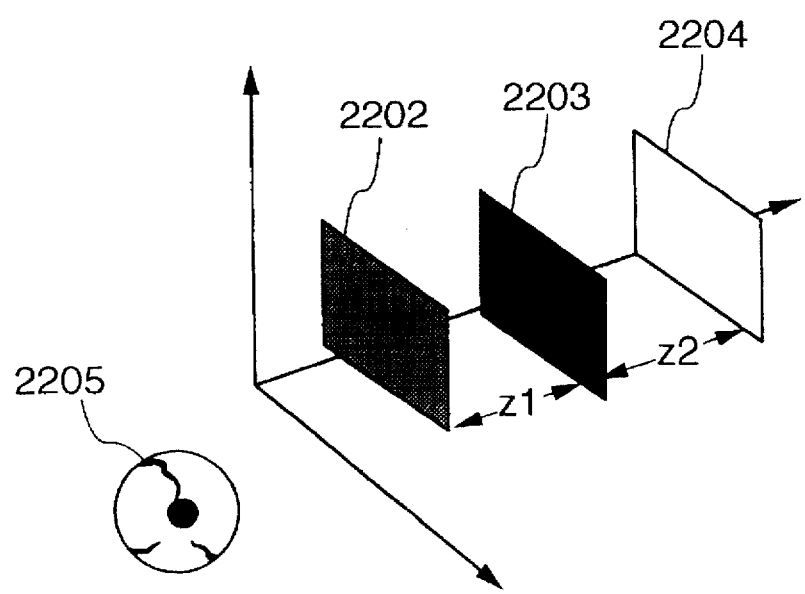

FIGS. 22A and 22B illustrate a method of expressing overlapping objects in a drawing space by acoustic image localization in a three-dimensional acoustic space. This embodiment expresses information about the overlapping order of overlapping objects 2202 to 2204 show in FIG. 22A by the respective depths of acoustic images relative to the user. For example, a sound assigned to the foremost object 2202 is localized with reference to the object 2202 by the method previously described with reference to FIG. 21. A sound assigned to the object 2203 behind the object 2202 is localized away from the user 2205 by a set distance $z1$ from the object 2202 by the method previously described with reference to FIG. 21. Similarly, a sound assigned to the object 2204 is localized away from the user 2205 by a distance $z2$ from the object 2203. Thus, the overlapping objects can be expressed. The distances $z1$ and $z2$ may be equal to each other or may be determined selectively according to the characteristics of the sense of hearing so that the distances $z1$ and $z2$ are equal to each other in hearing effect. Any one of the objects behind the foremost object may be used as the reference object instead of the foremost object. When the object other than the foremost object is selected as the reference object, the objects before the reference object are located on the side of the user. When the reference object is selected by the user, positions of localization on the opposite sides of the reference object selected by the user can be fixed by changing the selected object. Human acoustic image perception is sensitive to the change of position, the positions of the acoustic images of the objects are moved continuously when the selected object is changed to facilitate the user's perception of the condition.

The assignment of the specific sounds to the attributes of an object in a drawing space and the generation of the sounds for set periods of time corresponding to the length of the outline and the positions of the vertices of the outline enables the acoustical understanding of the shape of the object. The generation of the sound for a set period of time corresponding to the travel of the object enables the acoustical understanding of the travel of the object. The generation of the sound for a set period of time corresponding to the ratio of change in size of the object enables the acoustical understanding of the change in size of the object. The generation of the specific sound corresponding to the gradation of the color of the object enables the acoustical understanding of the density of the color of the object. The generation of the sound corresponding to the position of the object in a drawing space enables the acoustical understanding of the position of the object. The localization of the sounds representing the attributes of the object in a drawing space at specific positions in an acoustic space enables the simultaneous expression of detailed information about the shape and the size of the object and information about the position of the object.

The invention has been described with reference to the preferred embodiments thereof. Obviously, modifications and alterations occur to those with ordinary skill in the art upon reading and understanding the present invention. It is intended that the invention be construed as including all such modifications and alterations in so far they come with the the scope of the appended claims or the equivalent thereof.

What is claimed is:

1. A method of acoustically expressing image information about a shape of an object displayed on a graphical user interface display screen, comprising:

preparing a look-up table relating respective shape attributes of objects with respective timbres of sounds assigned to the respective shape attributes of the objects;

specifying an object displayed on the display screen;

specifying at least one sound assigned to at least one shape attribute of the object referring to the look-up table; and producing acoustic information about the at least one shape attribute of the object by generating the at least one sound assigned to the shape attribute of the object.

2. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein the attribute of the shape of the object is the length of the outline of the object, and the duration of generation of the sound is controlled according to the length of the outline.

3. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein the attribute of the shape of the object is the curvature of the outline of the object, and the timbre or the tone of the sound assigned to the shape of the object is controlled according to the curvature of the outline.

4. A method of acoustically expressing image information about an object displayed on a graphical user interface display screen, according to claim 2, wherein the timbre or the tone of the sound assigned to the shape of the object is determined according to the inclinations of the sections of the outline of the object.

5. A method of acoustically expressing image information about an object displayed on a graphical user interface display screen, according to claim 2, wherein vertices, if any, of the shape of the object are expressed acoustically by interrupting the generation of the sound assigned to the shape of the object at time positions respectively corresponding to the vertices.

6. A method of acoustically expressing image information about an object displayed on a graphical user interface display screen, according to claim 2, wherein vertices, if any, of the shape of the object are expressed acoustically by changing the timbre or the tone of the sound assigned to the shape of the object at time positions respectively corresponding to the vertices.

7. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein, when the object has a concealed portion, the concealed portion is expressed acoustically by expressing the concealed portion by a sound different from the sound assigned to the shape of the object.

8. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein the duration of generation of the sound assigned to the shape of the object is controlled according to a value indicating a change in the position of the object relative to the display screen, and the shape of the object is expressed acoustically.

9. A method of acoustically expressing image information about an object displayed on a graphical user interface display screen, according to claim 8, wherein the value indicating a change in the position of the object relative to the display screen is the travel of the object in the display screen.

10. A method of acoustically expressing image information about an object displayed on a graphical user interface display screen, according to claim 8, wherein the value indicating a change in the position of the object relative to the display screen is a change in the ratio of the area of the object to that of the display screen.

11. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein the duration of generation of the sound assigned to the shape of the object is controlled, the output sound is controlled according to the gradation of a color representing the object, and the shape of the object is expressed acoustically by acoustic information.

12. A method of acoustically expressing image information about an object displayed on a graphical user interface display screen, according to claim 11, wherein the variation of the output sound assigned to the color is the variation of the output sound in band-pass frequency characteristic.

13. A method of acoustically expressing image information about an object displayed on a graphical user interface display screen, according to claim 11, wherein the output sound assigned to the color is a band noise obtained by filtering white noise by a band-pass filter of a specific band-pass frequency characteristics.

14. A method of acoustically expressing image information about an object displayed on a graphical user interface display screen, comprising:

preparing a look-up table showing the relation between the shapes of objects and the timbres of sounds assigned to the shapes of the objects;

specifying an object displayed on the display screen;

specifying the sound assigned to the object referring to the look-up table; and producing acoustic information about the attribute of the shape of the object by generating the sound assigned to the shape of the object in a mode corresponding to the attribute of the shape of the object;

wherein the coordinates of the outline, vertices or the center of gravity of the object in a drawing space are mapped to coordinates indicating positions in an acoustic space, and the object is expressed by localizing the sound assigned to the object at the coordinates in the acoustic space.

15. A method of acoustically expressing image information about an object displayed on a graphical user interface display screen, according to claim 14, wherein the relation between a plurality of overlapping objects in the drawing space is expressed by localizing the sounds respectively assigned to the objects at different positions in an acoustic space, respectively.

16. A method of acoustically expressing image information about an object displayed on a graphical user interface display screen, according to claim 14, wherein the sound assigned to the object is generated when the object is selected on the display screen or when a position indicated by a position indicating means is within an area held by the object.

17. A method of acoustically expressing image information about a shape of an object displayed on a graphical user interface display screen, comprising:

preparing a look-up table relating respective shape attributes of objects with respective timbres of sounds assigned to the respective shape attributes of the objects;

specifying an object displayed on the display screen;

specifying two sounds assigned to at least two shape attributes of the object referring to the look-up table; and producing acoustic information about the at least two shape attributes of the object by generating the at least two sounds assigned to the shape attributes of the object.

* * * * *